United States Patent
Cheng et al.

(10) Patent No.: US 8,986,062 B2
(45) Date of Patent: Mar. 24, 2015

(54) METHOD FOR REPAIRING WHITE DEFECT OF LIQUID CRYSTAL DISPLAY PANEL

(71) Applicant: Shenzhen China Star Optoelectronics Technology Co., Ltd., Shenzhen, Guangdong (CN)

(72) Inventors: Wenda Cheng, Shenzhen (CN); Chujen Wu, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 12 days.

(21) Appl. No.: 13/817,784

(22) PCT Filed: Jan. 23, 2013

(86) PCT No.: PCT/CN2013/070860
§ 371 (c)(1),
(2) Date: Feb. 19, 2013

(87) PCT Pub. No.: WO2014/110841
PCT Pub. Date: Jul. 24, 2014

(65) Prior Publication Data
US 2014/0206252 A1 Jul. 24, 2014

(30) Foreign Application Priority Data
Jan. 18, 2013 (CN) .......................... 2013 1 0018673

(51) Int. Cl.
*H01J 9/50* (2006.01)
*G02F 1/13* (2006.01)

(52) U.S. Cl.
CPC .................................... *G02F 1/1309* (2013.01)
USPC ................................ 445/2; 349/106; 349/192

(58) Field of Classification Search
USPC ............................................................ 445/2
See application file for complete search history.

(56) References Cited

U.S. PATENT DOCUMENTS 3,463,898 A * 8/1969 Takashi et al. ............ 219/121.63
3,586,816 A * 6/1971 Hagen ...................... 219/121.63
(Continued)

FOREIGN PATENT DOCUMENTS

| CN | 101165904 A | 4/2008 |
| CN | 100399115 C * | 7/2008 |

(Continued)

OTHER PUBLICATIONS

Machine English translation of CN 100399115 to Chen et al.*
(Continued)

*Primary Examiner* — Sikha Roy
(74) *Attorney, Agent, or Firm* — Andrew C. Cheng

(57) ABSTRACT

A method for repairing white defect of liquid crystal display panel includes: (1) providing a laser repairing platform and a liquid crystal display panel that contains a white defect to be repaired, wherein the white defect contained liquid crystal display panel comprises a substrate, a first insulation layer formed on the common wiring layer, a metal layer formed on the first insulation layer, a second insulation layer formed on the metal layer, and a transparent conductive layer formed on the second insulation layer; and (2) applying the laser repairing platform to carry out multi-spot welding on the common wiring layer, the metal layer, and the transparent conductive layer at a location corresponding to a white defect of the liquid crystal display panel so as to have the common wiring layer, the metal layer, and the transparent conductive layer electrically connected at sites corresponding to the multiple welding spots.

6 Claims, 3 Drawing Sheets

(56) References Cited

U.S. PATENT DOCUMENTS

| | | | |
|---|---|---|---|
| 5,193,732 A * | 3/1993 | Interrante et al. | 228/1.1 |
| 5,926,246 A * | 7/1999 | Tomita et al. | 349/192 |
| 2004/0016925 A1* | 1/2004 | Watamura | 257/59 |
| 2006/0181672 A1* | 8/2006 | Son | 349/192 |
| 2009/0141231 A1* | 6/2009 | Lim et al. | 349/192 |
| 2010/0026923 A1* | 2/2010 | Chen et al. | 349/55 |
| 2010/0238386 A1 | 9/2010 | Yin et al. | |
| 2011/0074662 A1* | 3/2011 | Shyu et al. | 345/87 |

FOREIGN PATENT DOCUMENTS

| | | | |
|---|---|---|---|
| CN | 101697040 A | * | 4/2010 |
| CN | 102495502 A | | 6/2012 |

OTHER PUBLICATIONS

Machine English translation of CN 101697040 to Fu et al.*

* cited by examiner

METHOD FOR REPAIRING WHITE DEFECT OF LIQUID CRYSTAL DISPLAY PANEL

BACKGROUND OF THE INVENTION

1. Field of the Invention

The present invention relates to the field of liquid crystal displaying, and in particular to a method for repairing white defect of liquid crystal display panel.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal display panel and a backlight module. The operative principle of the liquid crystal panel is that liquid crystal molecules are interposed between two parallel glass substrates and the liquid crystal molecules are controlled to change direction by applying electricity to a circuit of the glass substrates in order to refract out light emitting from the backlight module for generating images.

Referring to FIG. 1, the liquid crystal display panel generally comprises: a TFT (Thin-Film Transistor) substrate 100, a CF (Color Filter) substrate 300 laminated on the TFT substrate 100, and liquid crystal 500 interposed between the TFT substrate 100 and the CF substrate 300. The TFT substrate 100 generally comprises a substrate 102 and a TFT array 104 formed on the substrate 102. The TFT array 104 is formed on the substrate 102 through mask processes. During the fabrication process of the TFT array 104, pixels are often easily contaminated in the fabrication process or damaged by static electricity so as to generate line defects and pixel defects. The line defect is breaking of a signal line and pixel defect is a defect occurring in a subpixel due to abnormal shorting or open circuit of thin-film transistors.

Pixel defects are classified as white defects, dark defects, and dull defects. The white defects keeps brightening when the screen is all dark and are thus very easily noticed due to extreme sensitivity of human eyes to them. It is preferred that the white defects can be repaired to be dark defects that are always dark or at least repairing the white defects to be dull defects that are dull.

Referring to FIGS. 2 and 3, a conventional white defect repairing method applied welding through single spot shot of laser beam at an overlapping site between an ITO layer 142 and a COM layer 146. The high temperature of the laser beam melts the metals so as to electrically connect the ITO layer 142, a second metal (metal 2) layer 144, and a common wiring (COM) layer 146 to each other thereby converting a white defect into a dark defect to complete the repairing of the white defect.

However, for the conventional single spot shot welding, if the welding spot 700 is relatively small, the repairing may fail. If the welding spot 700 is relatively large and the contact area of the welding spot 700 is $S_1=2\pi r_1 t_1$ (in which $r_1$ is the radius of the welding spot and $t_1$ is the length of the welding spot) that is relatively large, then the contact resistance (contact resistance being inversely proportional to the contact area and the formula is $R=\rho L/S$, in which $\rho$ is electrical resistivity, L is thickness, and S is contact area) of the welding spot 700 is relatively small, making the repairing quality deteriorating.

SUMMARY OF THE INVENTION

An object of the present invention is to provide a method for repairing white defect of liquid crystal display panel, wherein multi-spot welding is applied to improve the success rate of repairing, lowers the contact resistance, and enhances repairing quality.

To achieve the object, the present invention provides a method for repairing white defect of liquid crystal display panel, which comprises the following steps:

(1) providing a laser repairing platform and a liquid crystal display panel that contains a white defect to be repaired, wherein the white defect contained liquid crystal display panel comprises a substrate, a first insulation layer formed on the common wiring layer, a metal layer formed on the first insulation layer, a second insulation layer formed on the metal layer, and a transparent conductive layer formed on the second insulation layer; and (2) applying the laser repairing platform to carry out multi-spot welding on the common wiring layer, the metal layer, and the transparent conductive layer at a location corresponding to a white defect of the white defect contained liquid crystal display panel so as to have the common wiring layer, the metal layer, and the transparent conductive layer electrically connected at sites corresponding to the multiple welding spots.

The substrate is a glass substrate.

The first and second insulation layers are silicon oxide layers.

The metal layer is one of an aluminum layer, a molybdenum layer, and a copper layer.

The transparent conductive layer is an indium tin oxide layer.

In step (2), the laser repairing platform melts metal aluminum, molybdenum, or copper to carry out the multi-spot welding on the common wiring layer, the metal layer, and the transparent conductive layer.

The laser repairing platform comprises a base, an operation table mounted on the base, and a laser repairing head that is mounted on the base and is arranged above the operation table.

During the repairing, the white defect contained liquid crystal display panel is positioned on the operation table.

The present invention also provides a method for repairing white defect of liquid crystal display panel, which comprises the following steps:

(1) providing a laser repairing platform and a liquid crystal display panel that contains a white defect to be repaired, wherein the white defect contained liquid crystal display panel comprises a substrate, a first insulation layer formed on the common wiring layer, a metal layer formed on the first insulation layer, a second insulation layer formed on the metal layer, and a transparent conductive layer formed on the second insulation layer; and (2) applying the laser repairing platform to carry out multi-spot welding on the common wiring layer, the metal layer, and the transparent conductive layer at a location corresponding to a white defect of the white defect contained liquid crystal display panel so as to have the common wiring layer, the metal layer, and the transparent conductive layer electrically connected at sites corresponding to the multiple welding spots; and wherein the substrate is a substrate;

wherein the first and second insulation layers are silicon oxide layers;

wherein the metal layer is one of an aluminum layer, a molybdenum layer, and a copper layer;

wherein the transparent conductive layer is an indium tin oxide layer;

wherein in step (2), the laser repairing platform melts metal aluminum, molybdenum, or copper to carry out the multi-spot welding on the common wiring layer, the metal layer, and the transparent conductive layer;

wherein the laser repairing platform comprises a base, an operation table mounted on the base, and a laser repairing head that is mounted on the base and is arranged above the operation table; and wherein during the repairing, the white defect contained liquid crystal display panel is positioned on the operation table.

The efficacy of the present invention is that the method for repairing white defect of liquid crystal display panel according to the present invention applies multi-spot welding on a common wiring layer, a metal layer, and a transparent conductive layer of a white defect contained liquid crystal display panel at sites corresponding to a white defect so as to have the common wiring layer, the metal layer, and the transparent conductive layer electrically connected at the sites corresponding to the welding spots to effectively increase the success rate and also effectively reduce contact resistance to improve repairing quality.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 4:
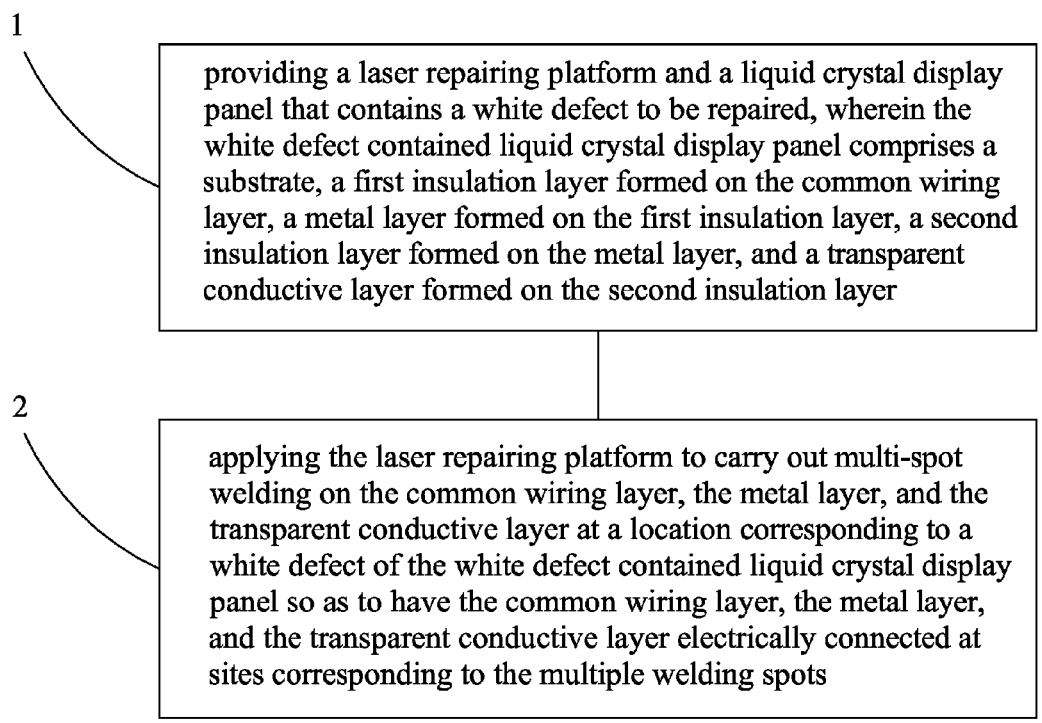
FIG. 4 is a flow chart illustrating a method for repairing white defect of liquid crystal display panel according to the present invention.
Figure 5:
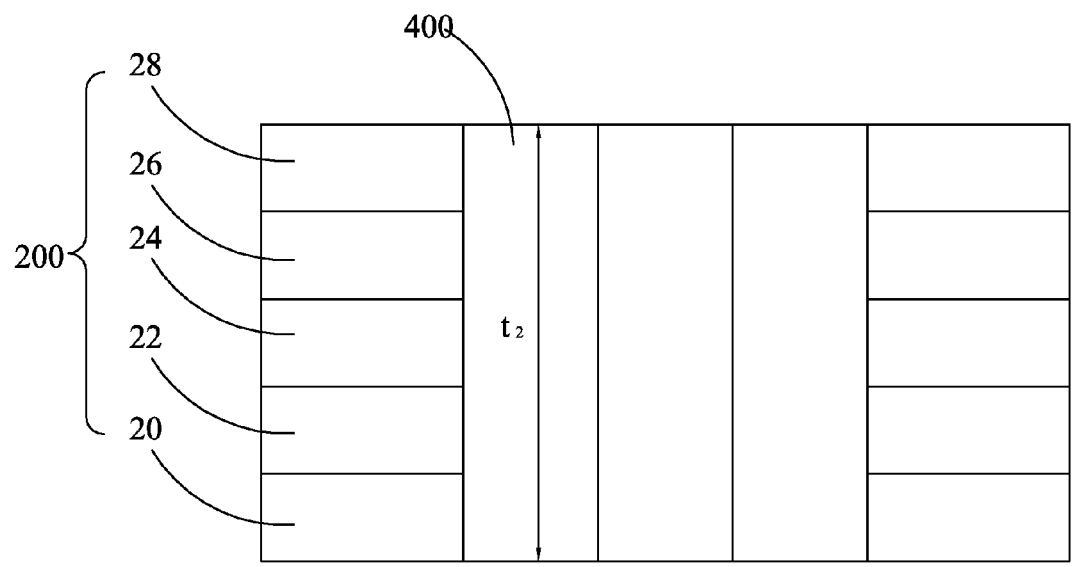
FIG. 5 is a schematic view showing a liquid crystal display panel that is subjected to repairing with multi-spot welding by applying the method for repairing white defect of liquid crystal display panel according to the present invention.
Figure 6:
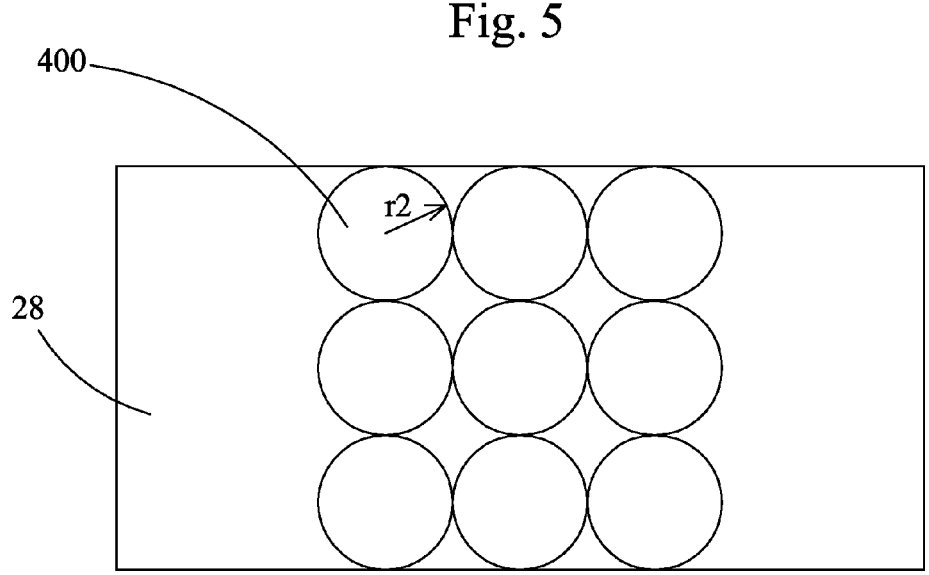
FIG. 6 is a top plan view of FIG. 5.

Referring to FIGS. 4-6, the present invention provides a method for repairing white defect of liquid crystal display panel, which comprises the following steps:

Step 1: providing a laser repairing platform (not shown) and a liquid crystal display panel 200 that contains a white defect to be repaired.

The laser repairing platform can be selected from any known models of laser repairing platform, which comprises a base, an operation table mounted on the base, and a laser repairing head that is mounted on the base and is arranged above the operation table.

The white defect contained liquid crystal display panel 200 comprises a substrate (not shown), a common wiring layer 20 formed on the substrate, a first insulation layer 22 formed on the common wiring layer 20, a metal layer 24 formed on the first insulation layer 22, a second insulation layer 26 formed on the metal layer 24, and a transparent conductive layer 28 formed on the second insulation layer 26.

The substrate is a transparent substrate. In the instant embodiment, the substrate is a glass substrate; the first and second insulation layers 22, 26 are silicon oxide layers; the metal layer 24 is an aluminum layer, a molybdenum layer, or a copper layer; and the transparent conductive layer 28 is an indium tin oxide layer.

Step 2: applying the laser repairing platform to carry out multi-spot welding on the common wiring layer 20, the metal layer 24, and the transparent conductive layer 28 at a location corresponding to a white defect of the white defect contained liquid crystal display panel 200 so as to have the common wiring layer 20, the metal layer 24, and the transparent conductive layer 28 electrically connected at sites corresponding to the multiple welding spots 400.

The detailed operation is as follows. The white defect contained liquid crystal display panel 200 is positioned on the operation table of the laser repairing platform. The laser repairing head of the laser repairing platform is operated carry out the multi-spot welding on the common wiring layer 20, the metal layer 24, and the transparent conductive layer 28 at sites corresponding to the white defect of the white defect contained liquid crystal display panel 200.

Preferably, for different materials of the metal layer 24, the laser repairing platform performs multi-spot welding of the common wiring layer 20, the metal layer 24, and the transparent conductive layer 28 through melting the corresponding metal. In other words, when the metal layer 24 is an aluminum layer, the laser repairing platform melts the metal aluminum to have aluminum vaporized to effect multi-spot welding of the common wiring layer 20, the metal layer 24, and the transparent conductive layer 28. Similarly, when the metal layer 24 is a molybdenum layer, the laser repairing platform melts the metal molybdenum to have molybdenum vaporized to effect multi-spot welding of the common wiring layer 20, the metal layer 24, and the transparent conductive layer 28. When the metal layer 24 is a copper layer, the laser repairing platform melts the metal copper to have copper vaporized to effect multi-spot welding of the common wiring layer 20, the metal layer 24, and the transparent conductive layer 28.

The method for repairing white defect of liquid crystal display panel according to the present invention uses a number of welding spots 400, whereby when one or some welding spots 400 fail, the remaining welding spots 400 may still effect electrical connection among the common wiring layer 20, the metal layer 24, and the transparent conductive layer 28 so as to effective enhance the result of repairing. Compared to the conventionally adopted single spot shot welding, the welding spots 400 provided in accordance with the present invention have lessened contact resistance.

Figure 1:
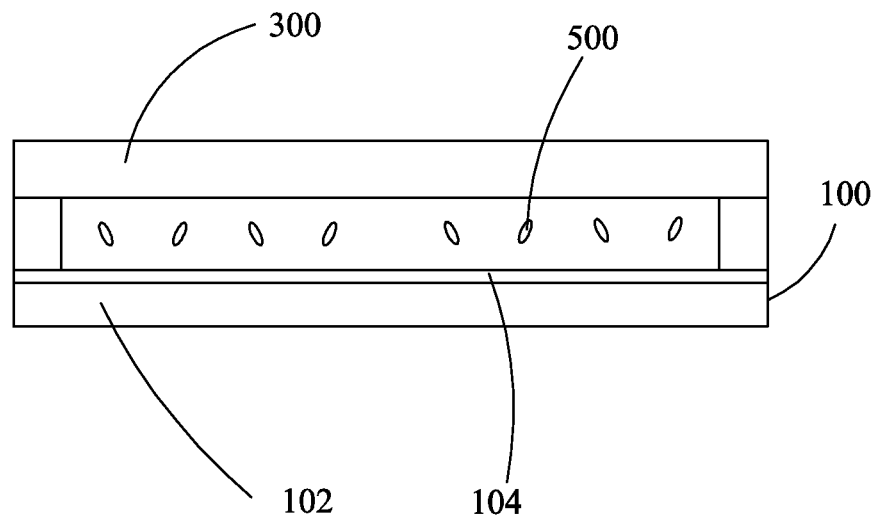
FIG. 1 is a schematic view showing a conventional liquid crystal display panel.
Figure 2:
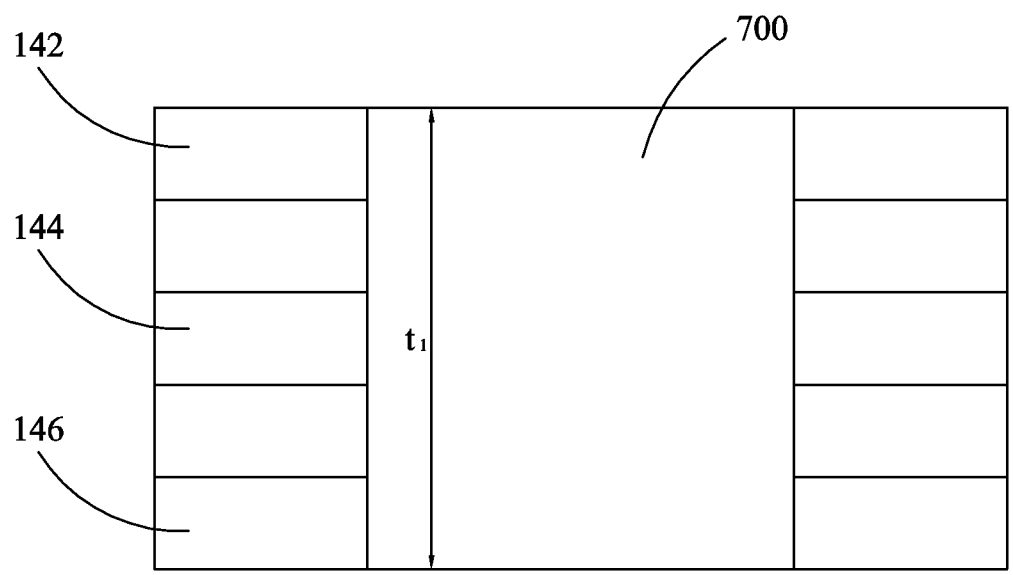
FIG. 2 is a schematic view showing a conventional single-spot welded liquid crystal display panel.
Figure 3:
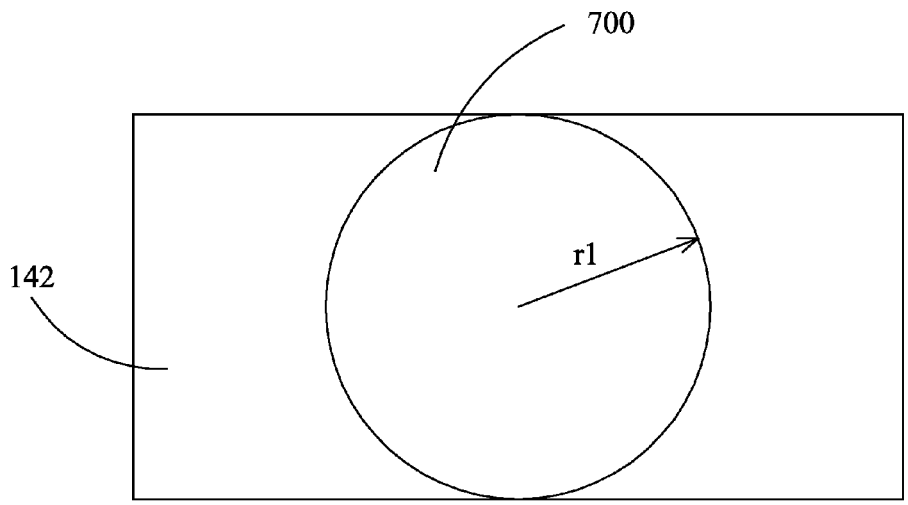
FIG. 3 is a top plan view of FIG. 2.

An example of nine welding spots 400 will be taken for illustrating the computation. Assuming that a welding spot 400 has a radius of $r_2$, then the contact area of the welding spot 400 is $S_2=2\pi r_2 t_2$ (in which $r_2$ is the radius of the welding spot and $t_2$ is length of the welding spot). Compared to the conventionally used single spot shot welding, the welding spot 400 adopted in the present invention has a radius $r_2=1/3r_1$ (see FIG. 3), so that the total contact area provided by the nine welding spots 400 of the present invention is $S=9*S_2=9*2\pi r_2 t_2=9*2\pi(1/3r_1)t_2=3*2\pi r_1 t_2=3S_1$ (for the same liquid crystal display panel, $t_1=t_2$). Thus, when the same metal is used in repairing the same liquid crystal display panel containing white defects, the contact area of welding spots provided by the present invention is three times of the welding spot contact area of the conventionally used single spot shot welding. Therefore, the contact resistance of the welding spots of the present invention is only one third of the welding spot contact resistance of the conventionally used single spot welding so that the welding resistance is relatively small and the repairing quality can be effectively improved.

In summary, the method for repairing white defect of liquid crystal display panel according to the present invention applies multi-spot welding on a common wiring layer, a metal layer, and a transparent conductive layer of a white defect contained liquid crystal display panel at sites corresponding to a white defect so as to have the common wiring layer, the metal layer, and the transparent conductive layer electrically connected at the sites corresponding to the welding spots to effectively increase the success rate and also effectively reduce contact resistance to improve repairing qualitt.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A method for repairing white defect of liquid crystal display pane, comprising the following steps:
   (1) providing a laser repairing platform and a liquid crystal display panel that contains a white defect to be repaired, wherein the white defect contained liquid crystal display panel comprises a substrate, a first insulation layer formed on a common wiring layer, a metal layer formed on the first insulation layer, a second insulation layer formed on the metal layer, and a transparent conductive layer formed on the second insulation layer; and
   (2) applying the laser repairing platform to carry out multi-spot welding on the common wiring layer, the metal layer, and the transparent conductive layer at a single location corresponding to the white defect of the white defect contained liquid crystal display panel so as to have the common wiring layer, the metal layer, and the transparent conductive layer electrically connected with the multiple welding spots, wherein the welding is carried out by melting a metallic material corresponding to the metal layer.

2. The method for repairing white defect of liquid crystal display panel as claimed in claim 1, wherein the substrate is a glass substrate.

3. The method for repairing white defect of liquid crystal display panel as claimed in claim 1, wherein the first and second insulation layers are silicon oxide layers.

4. The method for repairing white defect of liquid crystal display panel as claimed in claim 1, wherein the metal layer is one of an aluminum layer, a molybdenum layer, and a copper layer.

5. The method for repairing white defect of liquid crystal display panel as claimed in claim 1, wherein the transparent conductive layer is an indium tin oxide layer.

6. A method for repairing white defect of liquid crystal display panel, comprising the following steps:
   (1) providing a laser repairing platform and a liquid crystal display panel that contains a white defect to be repaired, wherein the white defect contained liquid crystal display panel comprises a substrate, a first insulation layer formed on a common wiring layer, a metal layer formed on the first insulation layer, a second insulation layer formed on the metal layer, and a transparent conductive layer formed on the second insulation layer; and
   (2) applying the laser repairing platform to carry out multi-spot welding on the common wiring layer, the metal layer, and the transparent conductive layer at a single location corresponding to the white defect of the white defect contained liquid crystal display panel so as to have the common wiring layer, the metal layer, and the transparent conductive layer electrically connected with the multiple welding spots, wherein the welding is carried out by melting a metallic material corresponding to the metal layer; and wherein the substrate is a glass substrate;

wherein the first and second insulation layers are silicon oxide layers; and wherein the metal layer is one of an aluminum layer, a molybdenum layer, and a copper layer;

wherein the transparent conductive layer is an indium tin oxide layer.

* * * * *